US008979037B2

(12) United States Patent  (10) Patent No.: US 8,979,037 B2
Wurzer et al.  (45) Date of Patent: Mar. 17, 2015

(54) CABLE TRAY APPARATUS FOR A PEOPLE MOVER SYSTEM

(75) Inventors: Adam J. Wurzer, Carroll, IA (US); Terry D. Wurzer, Carroll, IA (US); Cameron G. Lewis, Ames, IA (US); David T. Wurzer, Carroll, IA (US)

(73) Assignee: Terad Fabricating, Inc., Carroll, IA (US)

( * ) Notice: Subject to any disclaimer, the term of this patent is extended or adjusted under 35 U.S.C. 154(b) by 569 days.

(21) Appl. No.: 12/807,934

(22) Filed: Sep. 17, 2010

(65) Prior Publication Data

US 2012/0068023 A1    Mar. 22, 2012

(51) Int. Cl.
*F16L 3/00* (2006.01)
*H02G 9/00* (2006.01)
*H02G 9/02* (2006.01)
*H02G 3/06* (2006.01)

(52) U.S. Cl.
CPC ............ *H02G 9/025* (2013.01); *H02G 3/0608* (2013.01)
USPC ................ 248/49; 248/65; 248/70; 248/68.1; 248/274.1; 248/288.11; 248/258; 248/58; 248/59; 248/61; 174/39; 174/72 R; 174/72 C; 174/40 R; 174/75 R; 174/69; 174/84 R; 174/85; 174/86; 174/87; 174/88 S; 174/101

(58) Field of Classification Search
USPC ............. 248/49, 65, 70, 68.1, 274.1, 288.11, 248/258, 58–59, 61; 174/39, 72 R, 72 C, 174/40 R, 75 R, 69, 84 R, 85, 86, 87, 88 S, 174/101
See application file for complete search history.

(56) References Cited

U.S. PATENT DOCUMENTS

| | | | | |
|---|---|---|---|---|
| 3,471,629 A * | 10/1969 | O'Leary | | 174/666 |
| 4,969,400 A * | 11/1990 | Burg et al. | | 104/247 |
| 5,024,251 A * | 6/1991 | Chapman | | 138/92 |
| 5,887,831 A * | 3/1999 | Post | | 248/49 |
| 6,143,984 A * | 11/2000 | Auteri | | 174/68.3 |
| 6,344,611 B2 * | 2/2002 | Ewer et al. | | 174/488 |
| 6,498,296 B2 * | 12/2002 | Benito-Navazo | | 174/68.3 |
| 6,578,350 B2 * | 6/2003 | Blase et al. | | 59/78.1 |
| 6,609,684 B2 * | 8/2003 | Van Scoy et al. | | 248/49 |
| 6,889,443 B2 * | 5/2005 | Polk, Jr. | | 33/562 |
| 7,017,615 B2 * | 3/2006 | Suzuki et al. | | 138/110 |
| 7,145,079 B1 * | 12/2006 | Henry | | 174/101 |
| 7,562,629 B2 * | 7/2009 | Lohr et al. | | 105/72 |
| 8,119,914 B2 * | 2/2012 | Lubanski | | 174/97 |
| 2003/0155148 A1 * | 8/2003 | Lockard | | 174/68.1 |
| 2008/0283291 A1 * | 11/2008 | Makwinski et al. | | 174/481 |
| 2009/0084910 A1 * | 4/2009 | White | | 248/70 |
| 2010/0133390 A1 * | 6/2010 | Lange et al. | | 248/65 |

* cited by examiner

*Primary Examiner* — Christopher Garft
(74) *Attorney, Agent, or Firm* — Dennis L. Thomte; Thomte Patent Law Office LLC (57) ABSTRACT

A cable tray apparatus is provided a people mover system such as a Sky Train or the like. The cable tray apparatus is made up of a plurality of identical cable trays which are secured together in an end-to-end relationship. The cable trays are selectively laterally horizontally adjustable with respect to one another and are selectively vertically adjustable with respect to one another to correspond to curves in the roadway of the system and to correspond to elevational changes in the roadway of the system.

1 Claim, 10 Drawing Sheets

FIG. 11

CABLE TRAY APPARATUS FOR A PEOPLE MOVER SYSTEM

BACKGROUND OF THE INVENTION

1. Field of the Invention

This invention relates to a cable tray apparatus for use with a people mover system such as a Sky Train or the like. Even more particularly, the cable trays which make up the cable tray apparatus of this invention are identical and are secured together in an end-to-end relationship at one side of the cars of the people mover system. Even more particularly, this invention relates to a means for securing the cable trays together which permits the cable trays to be selectively laterally horizontally adjustable with respect to one another and selectively vertically adjustable with respect to one another.

2. Description of the Related Art

In people mover systems such as a Sky Train system, a plurality of vehicles or cars travel along a guideway or roadway with the guideway or roadway being normally elevated. Power and control signals for the cars normally comprise cables positioned in trays which are positioned on the roadway on one side of the cars traveling on the roadway. In the past, it is believed that the cable trays had to be cut and welded together to accommodate curves in the roadway and to accommodate elevational changes in the roadway.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A cable tray apparatus is provided for use with an electric train such as a Sky Train which travels along a power rail positioned on a roadway with the train including one or more cars having opposite sides. A plurality of generally rectangular electrical cable trays make up the cable tray apparatus with the cable trays having first and second ends and being identical to one another. The cable trays are connected together in an end-to-end relationship and are positioned on the roadway at one side of the cars of the train. The cable trays are selectively laterally horizontally adjustable with respect to one another and are selectively vertically adjustable with respect to one another to correspond to curves in the roadway and to correspond to elevational changes in the roadway respectively.

Each of the cable trays include a body portion having a cover selectively removably mounted on the upper end thereof. A plurality of upstanding partitions are provided in each of the body portions of the cable trays to provide a compartment for low-voltage cables, a compartment for high-voltage cables and a compartment for cables carrying control signals for the cars. The partitions not only stabilize the body portion but act as heat sinks.

One or more low-voltage lights are secured to one side of each of the cable trays which illuminate the roadway adjacent the cable tray apparatus. The cable tray apparatus will serve as a walkway or step to a walkway should the passengers be required to leave the car if the car becomes disabled and must stop along the length of the system.

The cover is selectively removably secured to the upper end of the body portion and the upper end of the partitions and is connected to the body portion by a flexible tether means so that the cover may be placed at one side of the cable tray should the cover need to be removed with the tether preventing the cover from falling from the roadway.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a partial perspective view illustrating the cable tray apparatus of this invention positioned adjacent a people mover system such as a sky train or the like;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The cable tray apparatus of this invention is referred to generally by the reference numeral 10 which is comprised of a plurality of elongated cable trays 12 which are secured together in an end-to-end manner so as to be selectively horizontally laterally adjustably secured together and so as to be selectively vertically adjustably secured together. Each cable tray 12 includes a body portion 14 and a cover 15 as will be described in more detail hereinafter. Preferably, the body portion 14 and the cover 15 are comprised of an aluminum material.

Each body portion 14 includes opposite ends 16 and 18. Each body portion 14 includes a bottom wall 20, an upstanding side wall 22 having an inwardly extending flange 24 at its upper end. Flange 24 is provided with notches 26 and 28 at its opposite ends. A plurality of horizontally spaced-apart, internally threaded screw openings 30 are formed in flange 24 along the length thereof. If the screw openings are not internally threaded, a small nut is secured to the underside of flange 24 at each of the openings 30.

Body portion 14 is also provided with a side wall 32 which includes an angularly disposed wall portion 34 and a vertically disposed wall portion 36 which has an inwardly extending and horizontally disposed flange 37 at its upper end which has a plurality of horizontally spaced-apart, internally threaded screw openings 39 formed therein along the length thereof. If the screw openings 39 are not internally threaded, a small nut is secured to the underside of flange 37 at each of the openings 39. Wall portion 36 has a slot 40 formed therein which extends thereinto at end 16 and a slot 41 formed therein which extends thereinto at end 18. Bottom wall 20 has slots 42, 44, 46, 48 and 50 formed therein which extend inwardly thereinto at end 16. Side wall 22 has slots 52 and 54 formed therein which extend inwardly thereinto from end 16. Wall portion 34 has a plurality of horizontally spaced-apart openings 56 formed therein along the length thereof to permit wires or cables to be extended therethrough.

Slots 58, 60 and 62 extend inwardly into bottom wall 20 at end 18 which are aligned with slots 42, 44 and 46 at end 16 respectively. Slots 64 and 66 extend inwardly into bottom wall at end 18 which are aligned with slots 48 and 50 respectively. Slots 68 and 70 extend inwardly into side wall 22 at end 18 which are aligned with slots 52 and 54 respectively.

Figure 5:
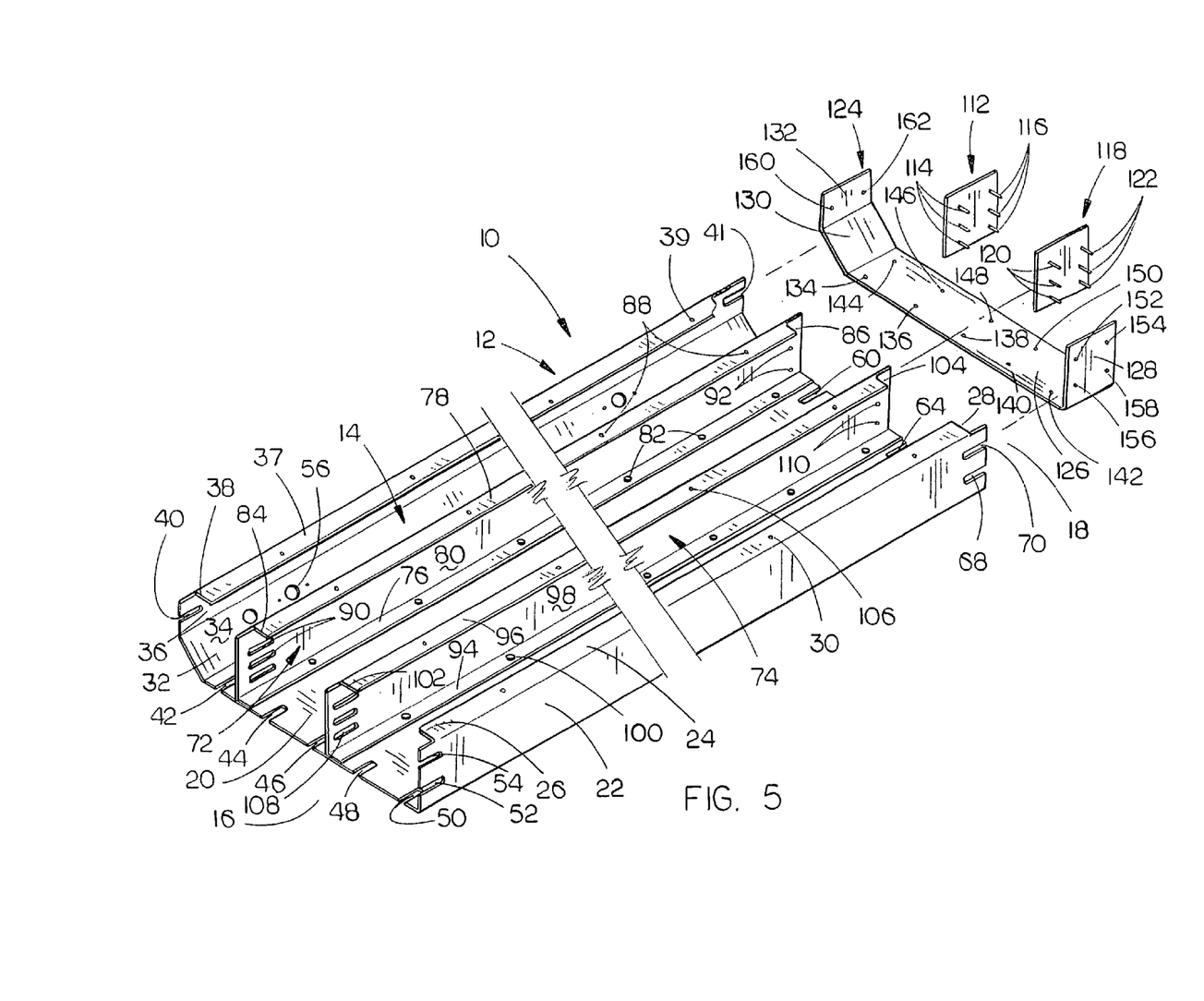
FIG. 5 is a partial exploded perspective view of the body portion and connector plates of one of the cable trays.

A pair of spaced-apart upstanding partitions 72 and 74 are secured to bottom wall 20 between side walls 22 and 32 as seen in FIG. 5. Although two partitions are illustrated, any number of partitions could be utilized. Partition 72 is channel-shaped in cross-section and includes a bottom flange 76, a top flange 78 and a web 80 extending therebetween. Bottom flange 76 is secured to bottom wall 20 by a plurality of screws or rivets 82. Top flange 78 has notches 84 and 86 formed therein at its opposite ends. Top flange 78 is provided with a plurality of horizontally spaced-apart, internally threaded openings 88 formed therein. If the openings 88 are not internally threaded, a small nut is secured to the underside of flange 78 at each of the openings 88. A plurality of vertically spaced-apart slots 90 are formed in web 80 inwardly of one end thereof. A plurality of vertically spaced-apart openings 92 are formed in web 80 at its other end.

Partition 74 is channel-shaped in cross-section and includes a bottom flange 94, a top flange 96 and a web 98 extending therebetween. Bottom flange 94 is secured to bottom wall 20 by a plurality of screws or rivets 100. Top flange 96 has notches 102 and 104 formed therein at its opposite ends. Flange 96 is provided with a plurality of horizontally spaced-apart, internally threaded openings 106 formed therein. If the openings 106 are not internally threaded, a small nut is secured to the underside of flange 96 at each of the openings 106. A plurality of vertically spaced-apart slots 108 are formed in web 98 inwardly of one end thereof. A plurality of vertically spaced-apart openings 110 are formed in web 98 at its other end.

The numeral 112 refers to a flat connector plate having a plurality of vertically aligned threaded studs 114 extending therefrom which are adapted to be received by the openings 92 in partition 72 and maintained therein by nuts in conventional fashion. Connector plate 112 also includes a plurality of vertically aligned threaded studs 116 extending therefrom which are adapted to extend through the slots 90 in the partition 72 of body portion 14 of a cable tray 12 positioned in an end-to-end relationship thereto and maintained therein by nuts in conventional fashion. The numeral 118 refers to a flat connector plate having a plurality of vertically aligned threaded studs 120 extending therefrom which are adapted to be received by the openings 110 in partition 74 and maintained therein by nuts in conventional fashion. Connector plate 118 also includes a plurality of vertically aligned threaded studs 122 extending therefrom which are adapted to extend through the slots 108 in the partition 74 of body portion 14 of a cable tray 12 positioned in an end-to-end relationship thereto and maintained therein by nuts in conventional fashion.

The numeral 124 refers to a connector plate which has the same general configuration, without flanges, as body portion 14 and which includes a bottom wall 126, side wall 128, angular side wall portion 130 and vertically disposed side wall portion 132. Bottom wall 126 of connector plate 124 has internally threaded bolt or screw openings 134, 136, 138, 140 and 142 formed therein adjacent one side edge thereof and internally threaded bolt openings 144, 146, 148, 150 and 151 (not shown) formed therein adjacent the other side edge thereof as seen in FIG. 5. Side wall 128 of connector plate 124 has internally threaded bolt or screw openings 152, 154, 156 and 158 formed therein as also seen in FIG. 5. Side wall portion 132 of plate 124 has internally threaded bolt or screw openings 160 and 162 formed therein. If the openings are not internally threaded, small nuts are secured to the outer sides of bottom wall 126, sidewall 128 and side wall portion 132 at each of the above-described openings.

Figure 6:
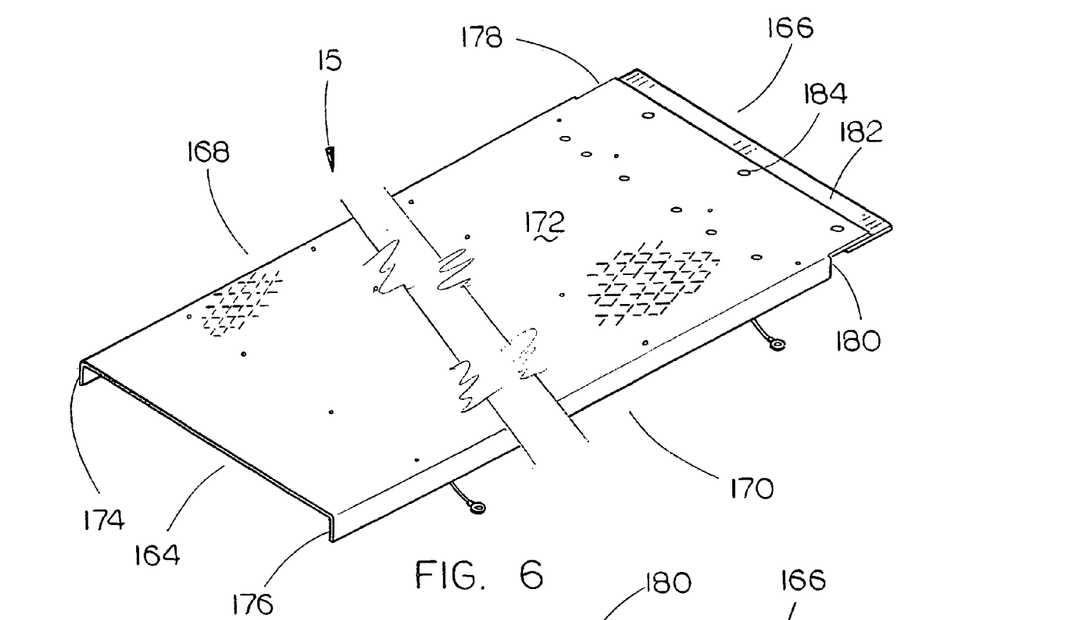
FIG. 6 is a partial top perspective view of the cover portion of the cable tray of this invention.
Figure 7:
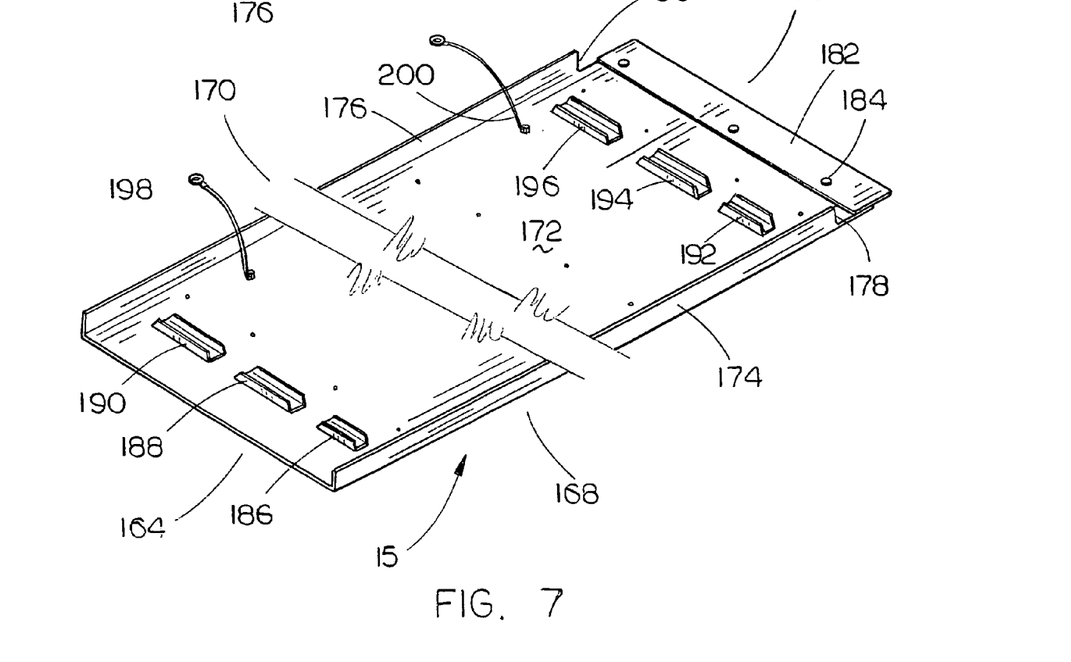
FIG. 7 is a partial bottom perspective view of the cover of FIG. 6.
Figure 10:
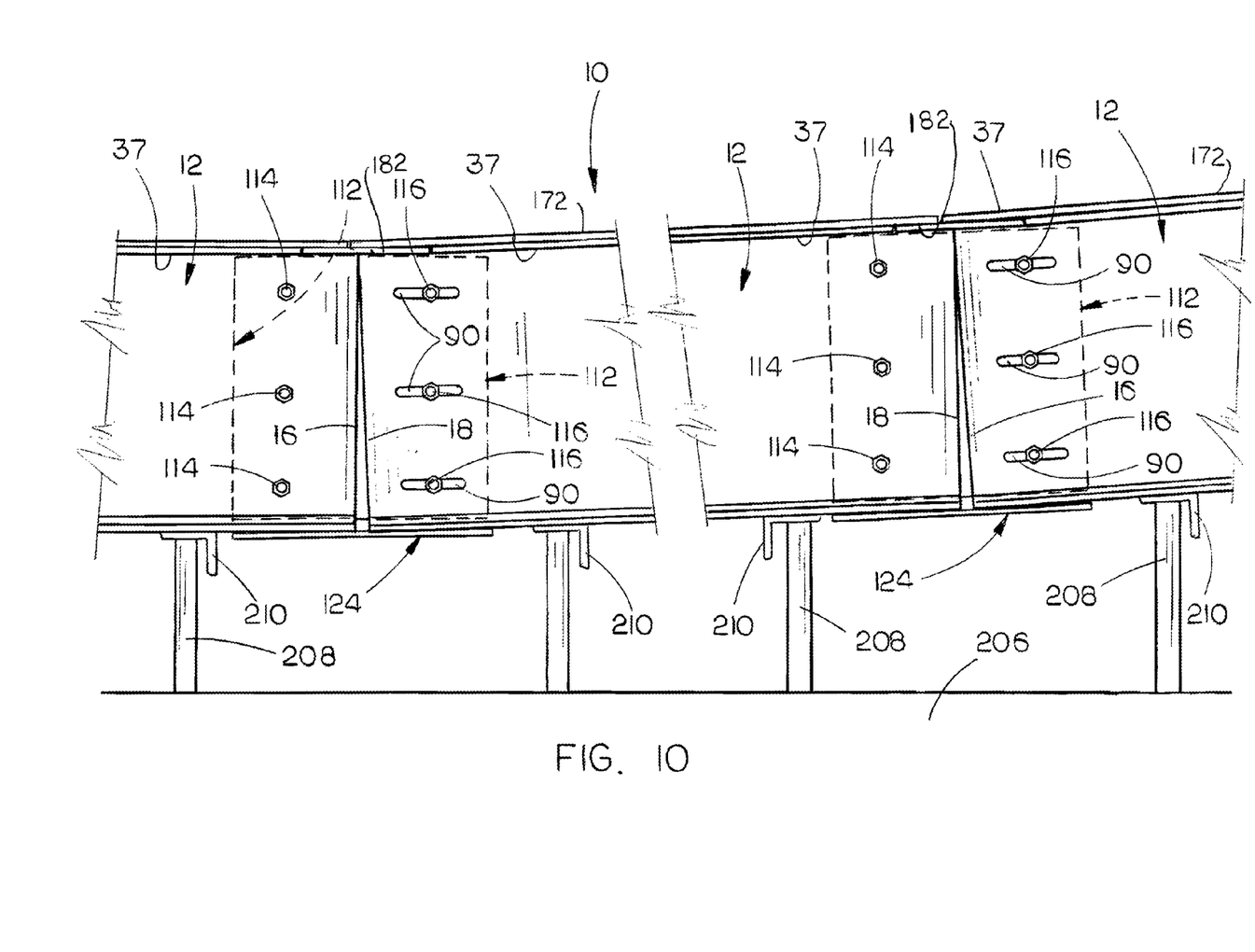
FIG. 10 is a partial vertical sectional view of the cable tray apparatus of this invention illustrating the manner in which the adjacent cable trays are selectively vertically adjustably mounted with respect to one another.

Cover 15, as seen in FIGS. 6 and 7, will be described as having opposite ends 164, 166 and opposite sides 168 and 170. Cover 15 includes a top wall 172 having side walls 174 and 176 extending downwardly therefrom at the opposite sides thereof. Side walls 174 and 176 have notches 178 and 180 formed therein respectively adjacent end 166 of cover 15. A flat rectangular plate 182 is secured to top wall 172 at end 166 of cover 15 by screws 184 so that plate 182 extends horizontally outwardly from the underside of top wall 172, for slidable engagement with the other end of the cover of a cable tray positioned adjacent thereto as seen in FIG. 10.

Elongated U-shaped brackets 186, 188 and 190 are secured to the underside of top wall 172 inwardly of end 164 of cover 15 in a spaced-apart relationship by screws. Elongated U-shaped brackets 192, 194 and 196 are secured to the underside of top wall 172 inwardly of end 166 of cover 15 in a spaced-apart relationship by screws. A third set of elongated U-shaped brackets are secured to the underside of top wall 172 between the first and second set of elongated U-shaped brackets.

A pair of flexible tethers 198 and 200 is secured at one end thereof to top wall 172 at the underside thereof by screws or the like. The other ends of the tethers 198 and 200 are secured to the inside surface of side wall 22 by screws, bolts or the like.

Figure 8:
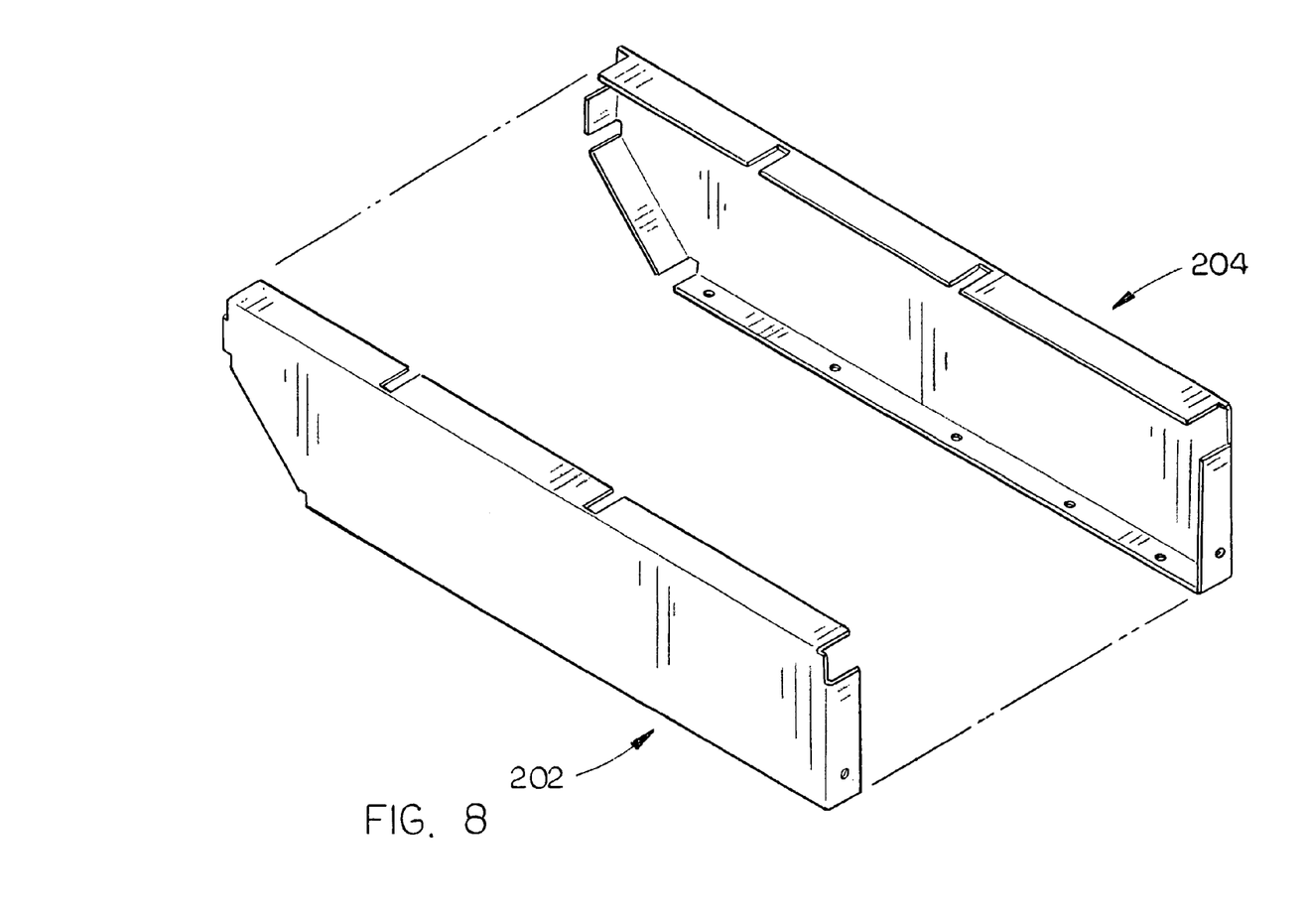
FIG. 8 is a perspective view illustrating a pair of end caps for use with the cable tray apparatus of this invention.

Cover 15 is selectively removably secured to body portion 14 of tray 12 by screws extending downwardly through top wall 172 into the openings 39 in flange 37, openings 88 in flange 78, openings 106 in flange 96 and openings 30 in flange 24. The numerals 202 and 204 refer to end caps which may be secured to the ends of the cable tray apparatus 10 as needed or required.

Figure 9:
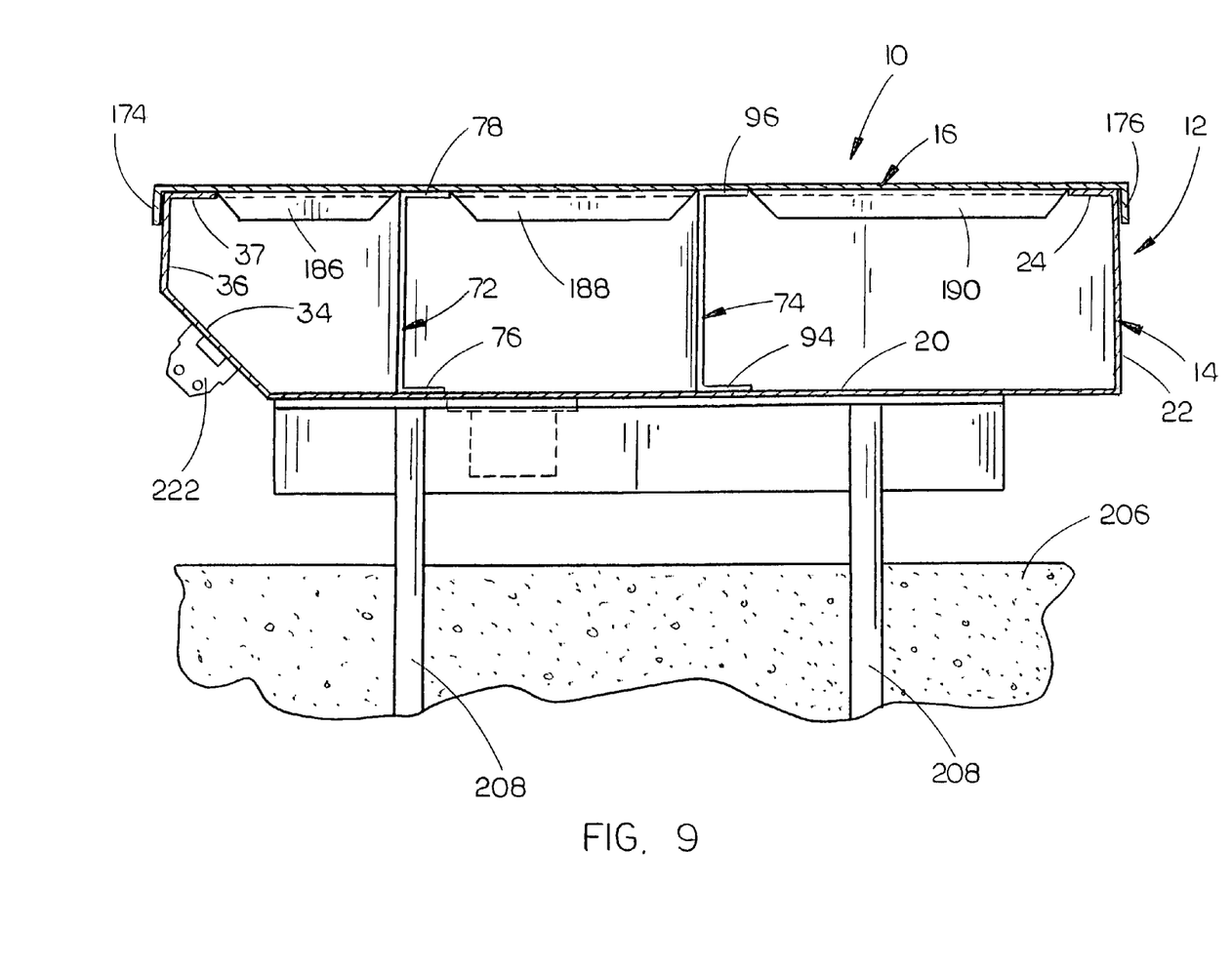
FIG. 9 is a vertical sectional view of one of the cable trays of this invention.

The cable tray apparatus 10 of this invention is designed to be utilized with a people mover system such as the Sky Train being constructed in Phoenix Ariz. The people mover system for which the cable tray apparatus of this invention has been designed includes a roadway 206 which will generally be elevated. The cable trays 12 are supported above the roadway 206 by means of a plurality of vertically disposed supports 208 which have their lower ends embedded in the roadway 206 as seen in FIG. 9 and which extend upwardly therefrom. The upper ends of supports 208 are secured to angle braces 210 which extend transversely across the bottoms of the cable trays 12 and which are secured thereto.

Figure 1:
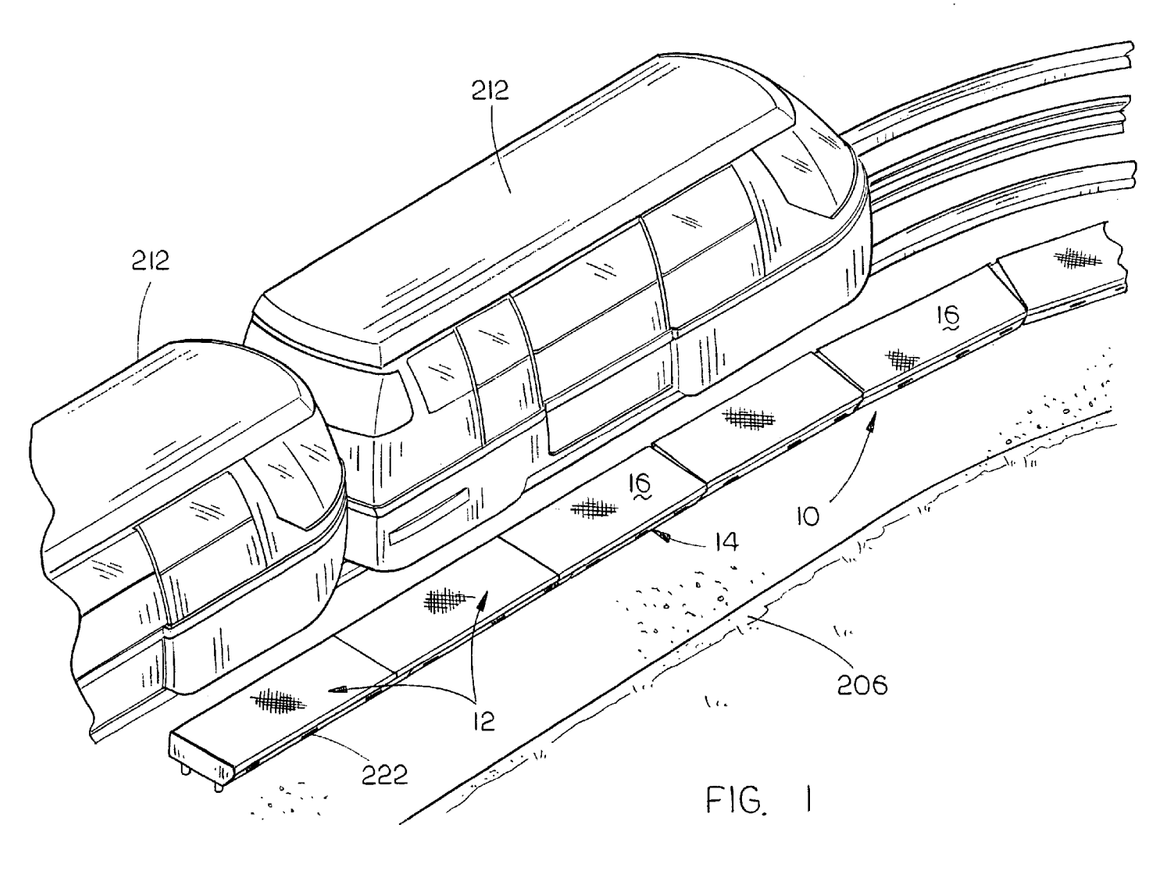
Figure 2:
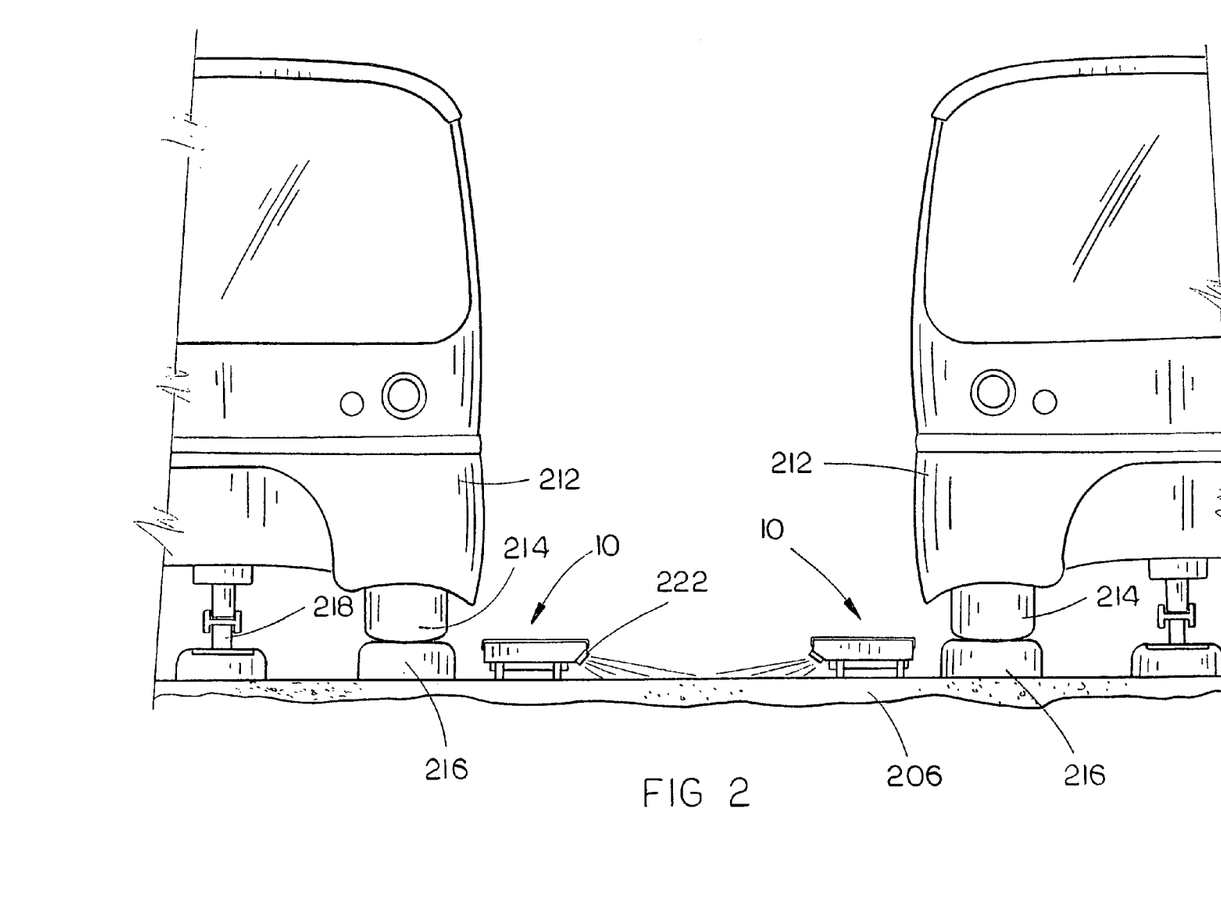
FIG. 2 is a partial front view of a pair of people mover vehicles positioned on an elevated roadway with a pair of the cable tray apparatuses of this invention positioned therebetween.
Figure 3:
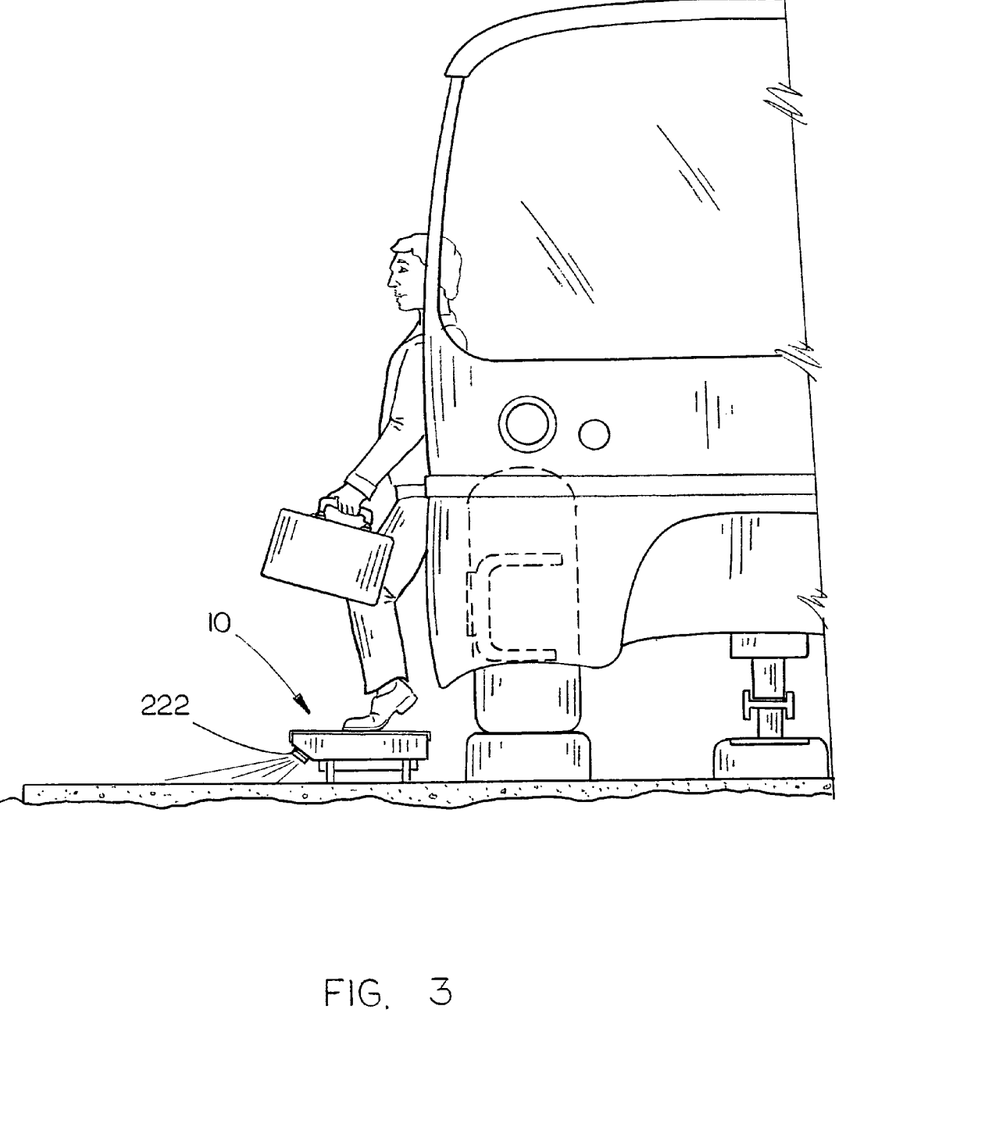
FIG. 3 is a partial front view illustrating a person stepping from the vehicle onto a cable tray apparatus of this invention.
Figure 4:
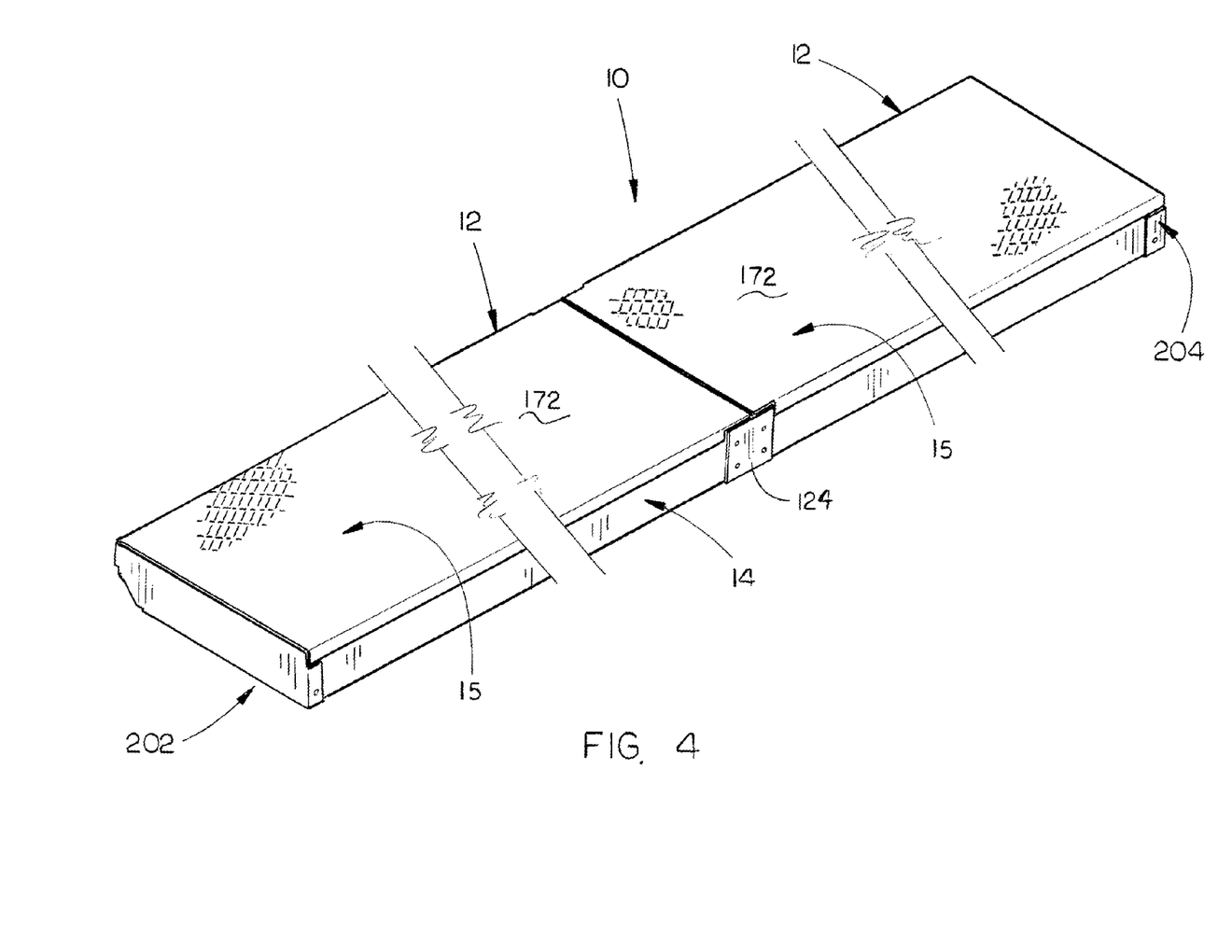
FIG. 4 is a partial perspective view of the cable tray apparatus of this invention.

The cable tray apparatus of this invention is designed, as stated above, to be used with the Sky Train people mover system being constructed in Phoenix, Ariz. The cable tray apparatus 10 will be supported on the roadway 206 at one side of the vehicle or car 212. Two of the cable tray apparatuses may be positioned between a pair of the vehicles 212 as illustrated in FIG. 2 or at one side of the vehicle 212 as seen in FIG. 1. The vehicles 212 have guide wheels 214 which roll along tire running surfaces 216 in conventional fashion. A guidebeam 218 is supported by roadway 206 between the surfaces 216. An electric power rail is associated with guidebeam 218 to provide power to the vehicle and to provide signals to the vehicle. A low voltage power conduit is positioned within body portion 14 outwardly of partition 72 for supplying low voltage to the lights 222 which are secured to the outer surface of wall portion 34 of body portion 14. A high voltage power conduit will be positioned in body portion 14 between side wall 22 and partition 74. A central signal conduit is positioned between partitions 72 and 74. The upper surface of cover 15 of the cable tray apparatus forms sidewalks for passenger use should the vehicle become disabled and stop at any point along the roadway.

The tethers 198 and 200 permit the cover 15 to be placed in an upside-down manner next to the cable tray should entry into the cable tray 12 be necessary. The tethers prevent the cover 15, when removed, from being blown from the roadway 206 and possibly injuring someone. The partitions 72 and 74 not only provide stability to body portion 14 and cover 15 but also act as heat sinks. The U-shaped brackets 186, 188, 190, 192, 194 and 196 not only provide strength to the cover 15 but also stabilize the side walls of body portion 14 and partitions 72 and 74.

Figure 11:
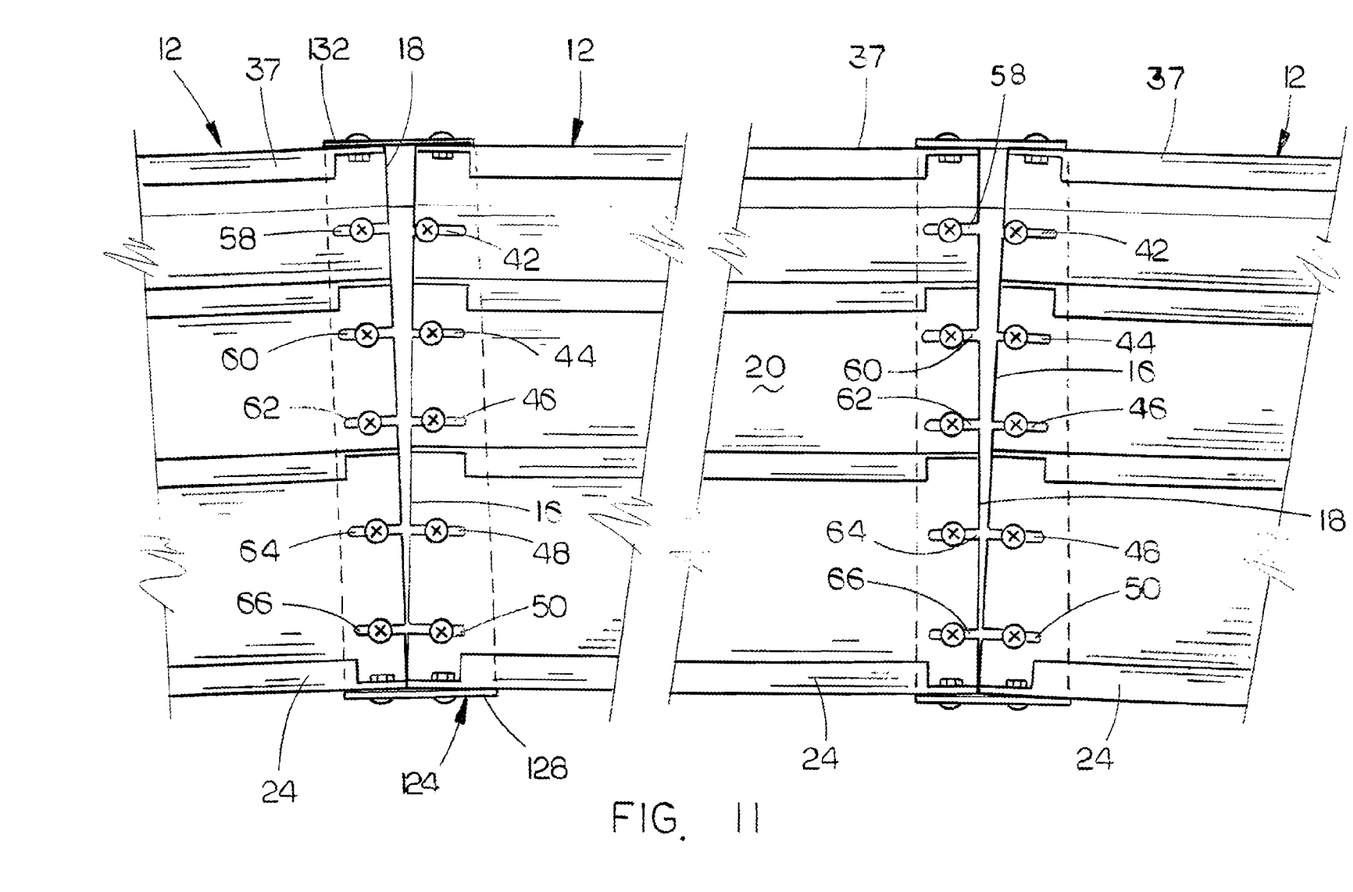
FIG. 11 is a partial top view of the cable tray apparatus of this invention illustrating the manner in which the cable trays thereof are selectively horizontally adjustably secured together in an end-to-end relationship.

The connector plates 112, 118 and 124 permit the cable trays 12 to be secured to one another in an end-to-end relationship but also permit the cable trays 12 to be selectively vertically adjusted with respect to one another to correspond to roadways which are inclined either upwardly or downwardly and to permit the cable trays 12 to be selectively horizontally adjusted with respect to one another to correspond to roadways which turn either right or left such as in curves. The connector plates 112, 118 and 124 and their connection to the partitions 72, 74 and the body portion 14 permit horizontal and vertical displacement between adjacent cable trays 12. FIG. 10 illustrates the manner in which the cable trays 12 may be selectively vertically adjusted with respect to one another while FIG. 11 illustrates the manner in which the cable trays 12 may be selectively laterally horizontally adjusted with respect to one another. As seen, such movement is achieved by certain of the screws and studs being slidably received by slots.

Thus it can be seen that the invention accomplishes at last all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination with an electric train which travels along a power rail positioned on a roadway with the train including one or more cars having opposite sides; comprising:
    a plurality of elongated generally rectangular electrical cable trays having first and second ends, first and second sides, and an open upper end;
    said cable trays being connected together in an end-to-end relationship;
    said cable trays being positioned on the roadway at one side of the cars of the train;
    said cable trays being selectively pivotally secured to one another about a horizontal axis to permit a vertical angle therebetween to be selectively adjusted;
    said cable trays also being selectively pivotally secured to one another about a vertical axis to permit a horizontal angle therebetween to be selectively adjusted;
    each of said cable trays including a body portion having a bottom wall with first and second ends and first and second upstanding side walls with upper ends;
    each of said cable trays also including an elongated cover selectively removably secured to said body portion thereof so as to extend between said upper ends of said first and second side walls between said first and second ends of said body portion to cover said open upper end of said body portion;
    each of said covers including a top wall having first and second ends located along a longitudinal axis and first and second sides, a first side wall extending downwardly from said first side of said top wall, and a second side wall extending downwardly from said second side of said top wall;
    each of said top walls of said covers having an upper surface and a lower surface;
    at least some of said covers having a plate portion which is secured to said top wall of said cover at the lower surface thereof which extends horizontally outwardly from said second end of said cover which is configured to be slidably received beneath the first end of the top wall of the cover on an adjacent cable tray;
    each of said cable trays having a plurality of spaced-apart upstanding partitions, having upper and lower ends, and first and second ends;
    said lower ends of said upstanding partitions being secured to said bottom wall of said body portion of the respective cable tray which extend between said first and second ends of the respective cable tray;
    said lower surface of at least some of said covers having a first row of elongated, spaced-apart inverted U-shaped brackets secured thereto which extend downwardly therefrom adjacent said first end of the cover and a second row of elongated, spaced-apart inverted U-shaped brackets secured thereto which extend downwardly therefrom adjacent said second end of the cover;
    each of said elongated inverted U-shaped brackets having a longitudinal axis which is transversely disposed with respect to the longitudinal axis of an associated cover and transversely disposed with respect to an associated cable tray;
    said upper ends of said partitions, adjacent said first ends thereof, being received between said spaced-apart brackets of said first row of brackets;
    said upper ends of said partitions, adjacent said second ends thereof, being received between said spaced-apart brackets of said second row of brackets said inverted U-shaped brackets being sufficiently spaced-apart whereby said upper ends of said partitions are located between said inverted U-shaped brackets;
said inverted U-shaped brackets strengthening said associated covers and said partitions functioning as heat sinks.

\* \* \* \* \*